(12) United States Patent
Liu et al.

(10) Patent No.: US 12,494,010 B2
(45) Date of Patent: Dec. 9, 2025

(54) METHOD, ELECTRONIC DEVICE, AND COMPUTER PROGRAM PRODUCT FOR VIDEO PROCESSING

(71) Applicant: Dell Products L.P., Round Rock, TX (US)

(72) Inventors: Zhisong Liu, Shenzhen (CN); Zijia Wang, WeiFang (CN); Zhen Jia, Shanghai (CN)

(73) Assignee: Dell Products L.P., Round Rock, TX (US)

(*) Notice: Subject to any disclaimer, the term of this patent is extended or adjusted under 35 U.S.C. 154(b) by 326 days.

(21) Appl. No.: 18/339,341

(22) Filed: Jun. 22, 2023

(65) Prior Publication Data
US 2024/0070956 A1 Feb. 29, 2024

(30) Foreign Application Priority Data
Aug. 24, 2022 (CN) .......................... 202211020897.5

(51) Int. Cl.
*G06T 13/80* (2011.01)
*G06N 3/08* (2023.01)
*G06T 11/60* (2006.01)
*G06T 13/40* (2011.01)

(52) U.S. Cl.
CPC ............... *G06T 13/80* (2013.01); *G06N 3/08* (2013.01); *G06T 11/60* (2013.01); *G06T 13/40* (2013.01)

(58) Field of Classification Search
None
See application file for complete search history.

(56) References Cited

PUBLICATIONS

Wang et al.; "Audio2Head: Audio-driven One-shot Talking-head Generation with Natural Head Motion;" Jul. 20, 2021; arXiv:2107.09293v1; pp. 1-8 (Year: 2021).*
L. Yu et al.; "Multimodal Learning for Temporally Coherent Talking Face Generation With Articulator Synergy," Jun. 25, 2021; in IEEE Transactions on Multimedia, vol. 24, pp. 2950-2962 (Year: 2021).*
O. Fried et al., "Text-Based Editing of Talking-head Video," ACM Transactions on Graphics, vol. 38, No. 4, Jul. 2019, pp. 68:1-68:14.
L. Xie et al., "Realistic Mouth-Synching for Speech-Driven Talking Face Using Articulatory Modelling," IEEE Transactions on Multimedia, vol. 9, No. 3, Apr. 2007, pp. 500-510.
E. Cosatto et al., "Lifelike Talking Faces for Interactive Services," Proceedings of the IEEE, vol. 91, No. 9, Sep. 2003, pp. 1406-1429.

(Continued)

*Primary Examiner* — Peter Hoang
(74) *Attorney, Agent, or Firm* — Ryan, Mason & Lewis, LLP (57) ABSTRACT

A method, an electronic device, and a computer program product for video processing are provided in embodiments of the present disclosure. The method generates an avatar image using a reference image and image data for a first frame in a video stream, and generates an avatar video using the avatar image and image data, audio data, and text data in the video stream. Through this solution, a user-defined avatar video adapted to a user of a real video and actions thereof can be generated more accurately and with high quality.

20 Claims, 7 Drawing Sheets

(56) References Cited

PUBLICATIONS

A. Wang et al., "Assembling an Expressive Facial Animation System," Proceedings of the 2007 ACM SIGGRAPH Symposium on Video Games, Aug. 2007, pp. 21-26.

A. Shysheya et al., "Textured Neural Avatars," IEEE/CVF Conference on Computer Vision and Pattern Recognition, Jun. 2019, pp. 2387-2397.

S. Ma et al., "Pixel Codec Avatars," IEEE/CVF Conference on Computer Vision and Pattern Recognition, arXiv:2104.04638v1, Apr. 9, 2021, 11 pages.

M. C. Doukas et al., "HeadGAN: One-Shot Neural Head Synthesis and Editing," IEEE/CVF International Conference on Computer Vision, Oct. 2021, pp. 14398-14407.

Y. Fan et al., "FaceFormer: Speech-Driven 3D Facial Animation with Transformers," arXiv:2112.05329v4, Mar. 17, 2022, 13 pages.

T.-C. Wang et al., "One-Shot Free-View Neural Talking-Head Synthesis for Video Conferencing, " IEEE/CVF Conference on Computer Vision and Pattern Recognition, Jun. 2021, pp. 10039-10049.

E. Zakharov et al., "Few-Shot Adversarial Learning of Realistic Neural Talking Head Models," IEEE/CVF International Conference on Computer Vision, arXiv:1905.08233v2, Sep. 25, 2019, 21 pages.

K. R. Prajwal et al., "A Lip Sync Expert Is All You Need for Speech to Lip Generation in the Wild," Proceedings of the 28th ACM International Conference on Multimedia, arXiv:2008.10010v1, Aug. 23, 2020, 10 pages.

A. Lahiri et al., "LipSync3D: Data-Efficient Learning of Personalized 3D Talking Faces from Video using Pose and Lighting Normalization," arXiv:2106.04185v1, Jun. 8, 2021, 16 pages.

J. S. Chung et al., "Out of Time: Automated Lip Sync in the Wild," Workshop on Multi-view Lip-reading, Asian Conference on Computer Vision, Nov. 2016, 14 pages.

X. Huang et al., "Arbitrary Style Transfer in Real-Time with Adaptive Instance Normalization," arXiv:1703.06868v2, Jul. 30, 2017, 11 pages.

X. Li et al., "Learning Linear Transformations for Fast Arbitrary Style Transfer," IEEE/CVF Conference on Computer Vision and Pattern Recognition, arXiv:1808.04537v1, Aug. 14, 2018, 12 pages.

Y. Li et al., "Diversified Texture Synthesis with Feed-Forward Networks," arXiv:1703.01664v1, Mar. 5, 2017, 11 pages.

F. Luan et al., "Deep Photo Style Transfer," arXiv:1703.07511v3, Apr. 11, 2017, 9 pages.

Y. Li et al., "Universal Style Transfer via Feature Transforms," 31st Conference on Neural Information Processing Systems, Dec. 2017, 11 pages.

W. Ma et al., "Block Shuffle: A Method for High-Resolution Fast Style Transfer with Limited Memory," IEEE Access, arXiv:2008.03706v1, Aug. 9, 2020, 12 pages.

D. Y. Park et al., "Arbitrary Style Transfer With Style-Attentional Networks," arXiv:1812.02342v5, May 23, 2019, 9 pages.

T. Karras et al., "Progressive Growing of GANs for Improved Quality, Stability, and Variation," The Sixth International Conference on Learning Representations, arXiv:1710.10196v3, Feb. 26, 2018, 26 pages.

T. Karras et al., "Analyzing and Improving the Image Quality of StyleGAN," IEEE/CVF Conference on Computer Vision and Pattern Recognition, Jun. 2020, pp. 8110-8119.

S. Yang et al., "Pastiche Master: Exemplar-Based High-Resolution Portrait Style Transfer," Conference on Computer Vision and Pattern Recognition, Mar. 24, 2022, 16 pages.

T. Karras et al., "A Style-Based Generator Architecture for Generative Adversarial Networks," IEEE/CVF Conference on Computer Vision and Pattern Recognition, Jun. 2019, pp. 4401-4410.

A. Baevski et al., "wav2vec 2.0: A Framework for Self-Supervised Learning of Speech Representations," Proceedings of the 34th International Conference on Neural Information Processing Systems, arXiv:2006.11477v3, Oct. 22, 2020, 19 pages.

F. Reda et al., "Pytorch Implementation of FlowNet 2.0: Evolution of Optical Flow Estimation with Deep Networks," https://github.com/NVIDIA/flownet2-pytorch, Accessed Jul. 21, 2022, 4 pages.

M. Loper et al., "SMPL: A Skinned Multi-Person Linear Model," ACM Transactions on Graphics, vol. 34, No. 6, Nov. 2015, 16 pages.

E. Corona et al., "SMPLicit: Topology-aware Generative Model for Clothed People," 2021 IEEE/CVF Conference on Computer Vision and Pattern Recognition, Jun. 2021, p. 11875-11885.

T. Li et al., "Learning a Model of Facial Shape and Expression from 4D Scans," ACM Transactions on Graphics, vol. 36, No. 6, Nov. 2017, 17 pages.

L. Wang et al., "HMM Trajectory-guided Sample Selection for Photo-realistic Talking Head," Multimedia Tools and Applications, vol. 74, No. 22, Nov. 2015, pp. 9849-9869.

K. Simonyan et al., "Very Deep Convolutional Networks for Large-Scale Image Recognition," International Conference on Learning Representations, arXiv:1409.1556v6, Apr. 10, 2015, 14 pages.

U.S. Appl. No. 17/993,025 filed in the name of Zhisong Liu et al. on Nov. 23, 2022, and entitled "Method, Device, and Computer Program Product for Processing Video.".

\* cited by examiner

METHOD, ELECTRONIC DEVICE, AND COMPUTER PROGRAM PRODUCT FOR VIDEO PROCESSING

RELATED APPLICATION

The present application claims priority to Chinese Patent Application No. 202211020897.5, filed Aug. 24, 2022, and entitled "Method, Electronic Device, and Computer Program Product for Video Processing," which is incorporated by reference herein in its entirety.

FIELD

Embodiments of the present disclosure relate to the field of computer technologies, and more particularly, to a method, an electronic device, and a computer program product for video processing.

BACKGROUND

Deep learning is one research direction in the field of machine learning, and is used for learning inherent laws and representation levels of sample data, so that machines can analyze and learn like humans, and can recognize data such as text, images, and sounds. Deep learning has a wide range of applications in computer vision, video processing, natural language processing, and other fields.

Avatar-based videos are increasingly popular in modern social networks as a target for video processing, such as in virtual meetings and video games. How to realize the generation of an avatar video more accurately according to needs is still an urgent problem to be solved.

SUMMARY

Embodiments of the present disclosure provide a solution for video processing.

In a first aspect of the present disclosure, a method for video processing is provided. The method includes: acquiring a video stream, the video stream including image data, audio data, and text data corresponding to video frames, and the video frames including a first frame; generating a first avatar image using a reference image and image data for the first frame; obtaining a video integration feature based on the first avatar image, the image data, the audio data, and the text data; and generating an avatar video corresponding to the video stream based on the first avatar image and the video integration feature.

In a second aspect of the present disclosure, an electronic device is provided. The electronic device includes at least one processor; and at least one memory storing computer-executable instructions, the at least one memory and the computer-executable instructions being configured to cause, together with the at least one processor, the electronic device to perform operations. The operations include: acquiring a video stream, the video stream including image data, audio data, and text data corresponding to video frames, and the video frames including a first frame; generating a first avatar image using a reference image and image data for the first frame; obtaining a video integration feature based on the first avatar image, the image data, the audio data, and the text data; and generating an avatar video corresponding to the video stream based on the first avatar image and the video integration feature.

In a third aspect of the present disclosure, a computer program product is provided. The computer program product is tangibly stored on a non-transitory computer-readable medium and includes computer-executable instructions, wherein the computer-executable instructions, when executed, cause a device to perform the following: acquiring a video stream, the video stream including image data, audio data, and text data corresponding to video frames, and the video frames including a first frame; generating a first avatar image using a reference image and image data for the first frame; obtaining a video integration feature based on the first avatar image, the image data, the audio data, and the text data; and generating an avatar video corresponding to the video stream based on the first avatar image and the video integration feature.

This Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

By more detailed description of example embodiments of the present disclosure, provided herein with reference to the accompanying drawings, the above and other objectives, features, and advantages of the present disclosure will become more apparent, where identical reference numerals generally represent identical components in the example embodiments of the present disclosure.

DETAILED DESCRIPTION

Principles of the present disclosure will be described below with reference to several example embodiments illustrated in the accompanying drawings. Although the drawings show example embodiments of the present disclosure, it should be understood that these embodiments are merely described to enable those skilled in the art to better understand and further implement the present disclosure, and not to limit the scope of the present disclosure in any way.

As used herein, the term "include" and variations thereof mean open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

As used herein, the term "machine learning" refers to processing involving high-performance computing, machine learning, and artificial intelligence algorithms. Herein, the term "machine learning model" may also be referred to as "learning model," "learning network," "network model," or "model." A "neural network" or "neural network model" is a deep learning model. In general, a machine learning model is capable of receiving input data, performing predictions based on the input data, and outputting prediction results.

Generally, a machine learning model may include multiple processing layers, each processing layer having multiple processing units. The processing units are sometimes also referred to as convolution kernels. In a convolution layer of a convolution neural network (CNN), processing units are referred to as convolution kernels or convolution filters. Processing units in each processing layer perform corresponding changes on inputs of the processing layer based on corresponding parameters. An output of a processing layer is provided as an input to the next processing layer. An input to the first processing layer of the machine learning model is a model input to the machine learning model, and an output of the last processing layer is a model output of the machine learning model. Inputs to the intermediate processing layers are sometimes also referred to as features extracted by the machine learning model. Values of all parameters of the processing units of the machine learning model form a set of parameter values of the machine learning model.

Machine learning may mainly be divided into three stages, namely, a training stage, a testing stage, and an application stage (also referred to as an inference stage). During the training stage, a given machine learning model can be trained using a large number of training samples and iterated continuously until the machine learning model can obtain, from the training samples, consistent inferences which are similar to the inferences that human intelligence can make.

Through training, the machine learning model may be considered as being capable of learning mapping or an association relationship between inputs and outputs from training data. After training, a set of parameter values of the machine learning model is determined. In the testing stage, the trained machine learning model may be tested by using test samples to determine the performance of the machine learning model. In the application stage, the machine learning model may be used for processing, based on the set of parameter values obtained from the training, actual input data to provide corresponding outputs.

With the rapid development of virtual worlds and virtual reality, avatars have great potential for many applications, such as a cartoon-style customer service, a virtual tour guide, and virtual identity exploration.

Currently, for avatar generation in videos, existing solutions mainly include the following: 1) audio-driven avatar generation; 2) text-driven avatar generation; and 3) multimodality-based avatar generation. In these solutions, the audio-driven avatar generation is a method of learning to match audio directly to the generated video. Similarly, the text-driven avatar generation is a method of learning to match text to the generated video. For the multimodality-based avatar generation, it mainly uses audio and video or text and video as inputs to supervise learning of human facial or mouth actions.

However, these solutions have limitations in avatar generation because a network is trained in a supervised manner and the generated video is biased towards training data. Moreover, the current generation of an avatar-based video usually has a given target avatar reference, and ignores unique features of a user, which may lead to identity theft and other network security issues. Due to the above problems, the existing solutions cannot achieve accurate avatar generation in practical video applications.

In order to solve at least the above problems, an improved solution for video processing is provided in example embodiments of the present disclosure. The solution utilizes an avatar image generated based on a reference image and image data for a first frame of a video stream, and generates an avatar video corresponding to the video stream based on the image data, audio data, and text data in the video stream.

Through the solution, more accurate avatar processing can be achieved on a video on the premise of preserving unique features of a user as much as possible. In this way, an avatar video generated by using an avatar that retains unique features of a user as a template and using image, audio, and text data at the same time can more accurately realize an exclusive avatar video that is unique to the user, thereby better solving identity theft and other network security issues.

Figure 1:
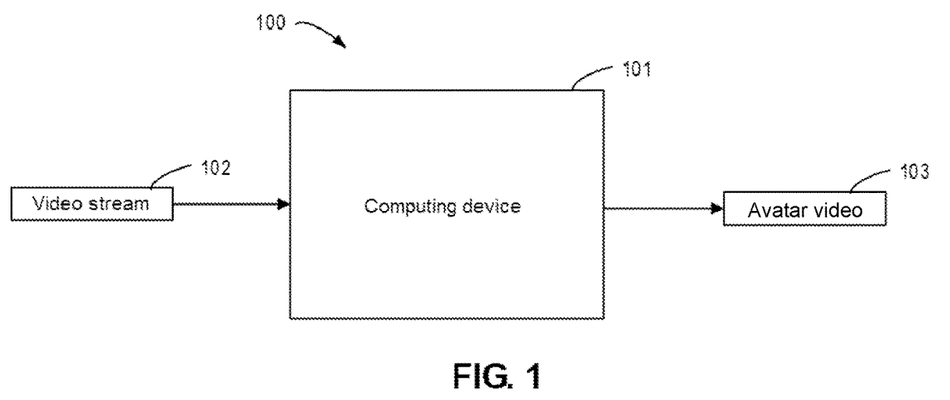
FIG. 1 is a schematic diagram of an example environment in which embodiments of the present disclosure can be implemented.

FIG. 1 is a schematic diagram of example environment 100 in which embodiments of the present disclosure can be implemented. Example environment 100 includes computing device 101.

Computing device 101 may generate, according to received video stream 102, avatar video 103 corresponding to the video stream. Video stream 102 includes images, sounds, and subtitles. The images in video stream 102 may be obtained from a camera of computing device 101. The sounds in video stream 102 may be obtained from a microphone of computing device 101. The subtitles in video stream 102 may be obtained by real-time translation of the sounds collected from the microphone. It should be understood that at least one of the images, sounds, and subtitles in video stream 102 may be obtained from any device external to computing device 101 and subsequently transmitted to computing device 101.

Computing device 101 can perform encoding and decoding processing on obtained video stream 102 to perform style conversion on the images in video stream 102, so as to realize avatar processing of video stream 102. The avatar-processed video is avatar video 103 corresponding to video stream 102.

Example computing device 101 includes, but is not limited to, a personal computer, a server computer, a handheld or laptop device, a mobile device (such as a mobile phone, a personal digital assistant (PDA), and a media player), a multi-processor system, a consumer electronic product, a minicomputer, a mainframe computer, a distributed computing environment including any one or more of the above systems or devices, and the like. The server may be a cloud server, also referred to as a cloud computing server or a cloud host, and is a host product in a cloud computing service system, for solving the existing problems of high management difficulty and weak business scalability in conventional physical hosts and Virtual Private Server (VPS) services. The server may also be a server of a distributed system or a server combined with a block chain.

Example embodiments for video processing in the present disclosure will be discussed in more detail below with reference to the accompanying drawings.

Figure 2:
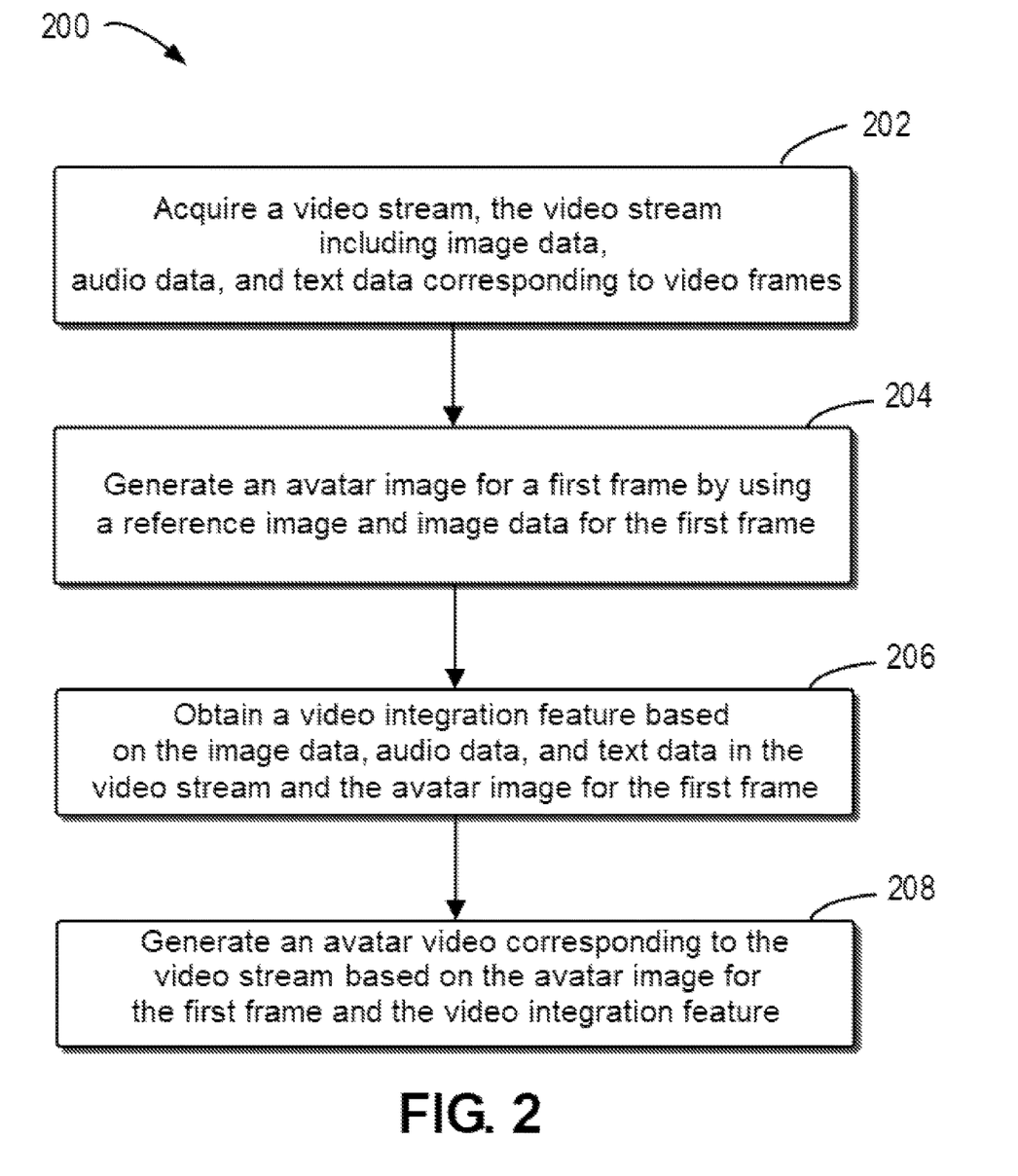
FIG. 2 is a flow chart of a method for video processing according to some embodiments of the present disclosure.

First referring to FIG. 2, FIG. 2 is a flow chart of method 200 for video processing according to some embodiments of the present disclosure. Method 200 may be performed by computing device 101 in FIG. 1 or any suitable computing device.

Figure 3A:
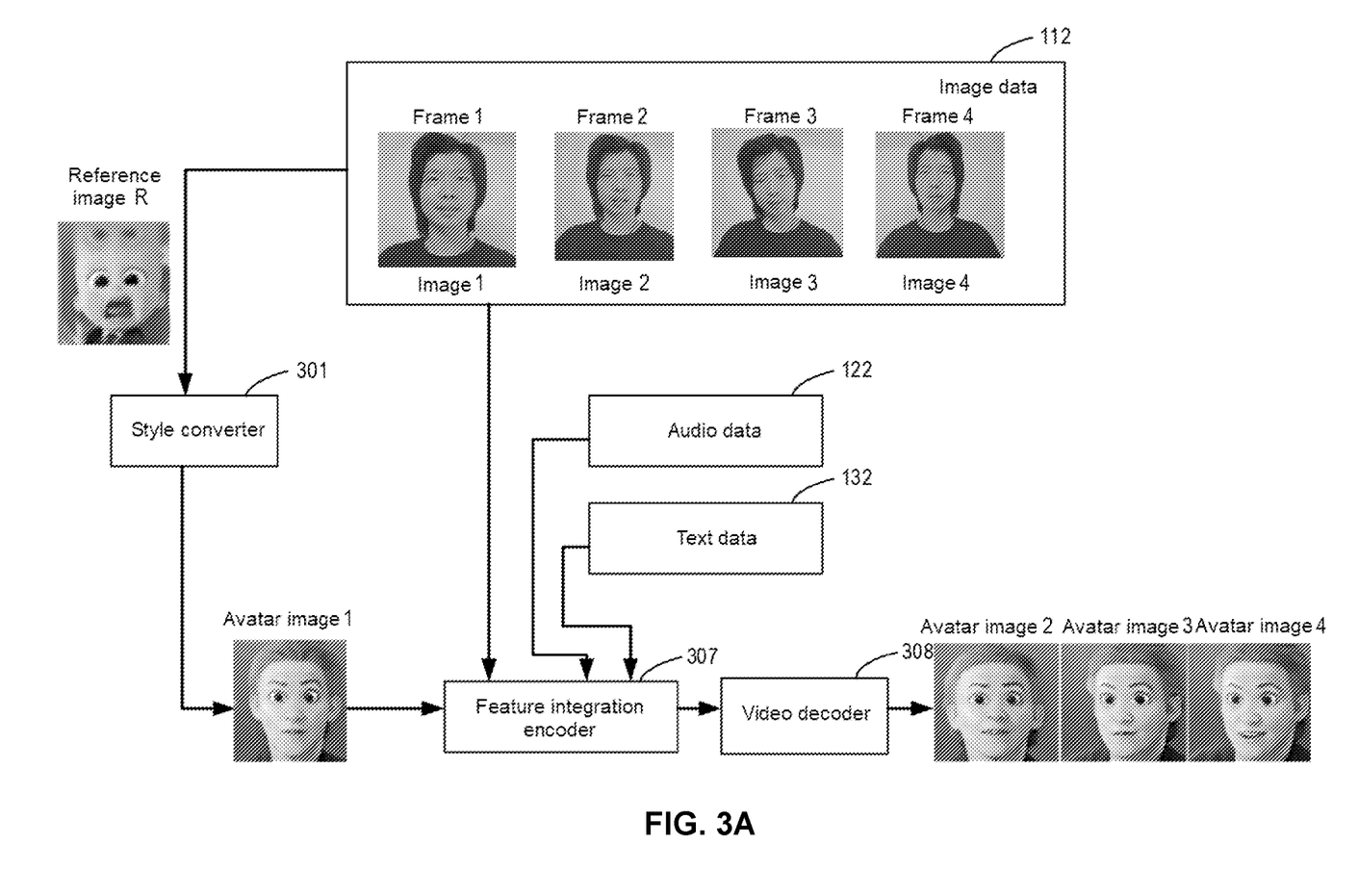
FIG. 3A and FIG. 3B are schematic diagrams of video processing according to some embodiments of the present disclosure.
Figure 3B:
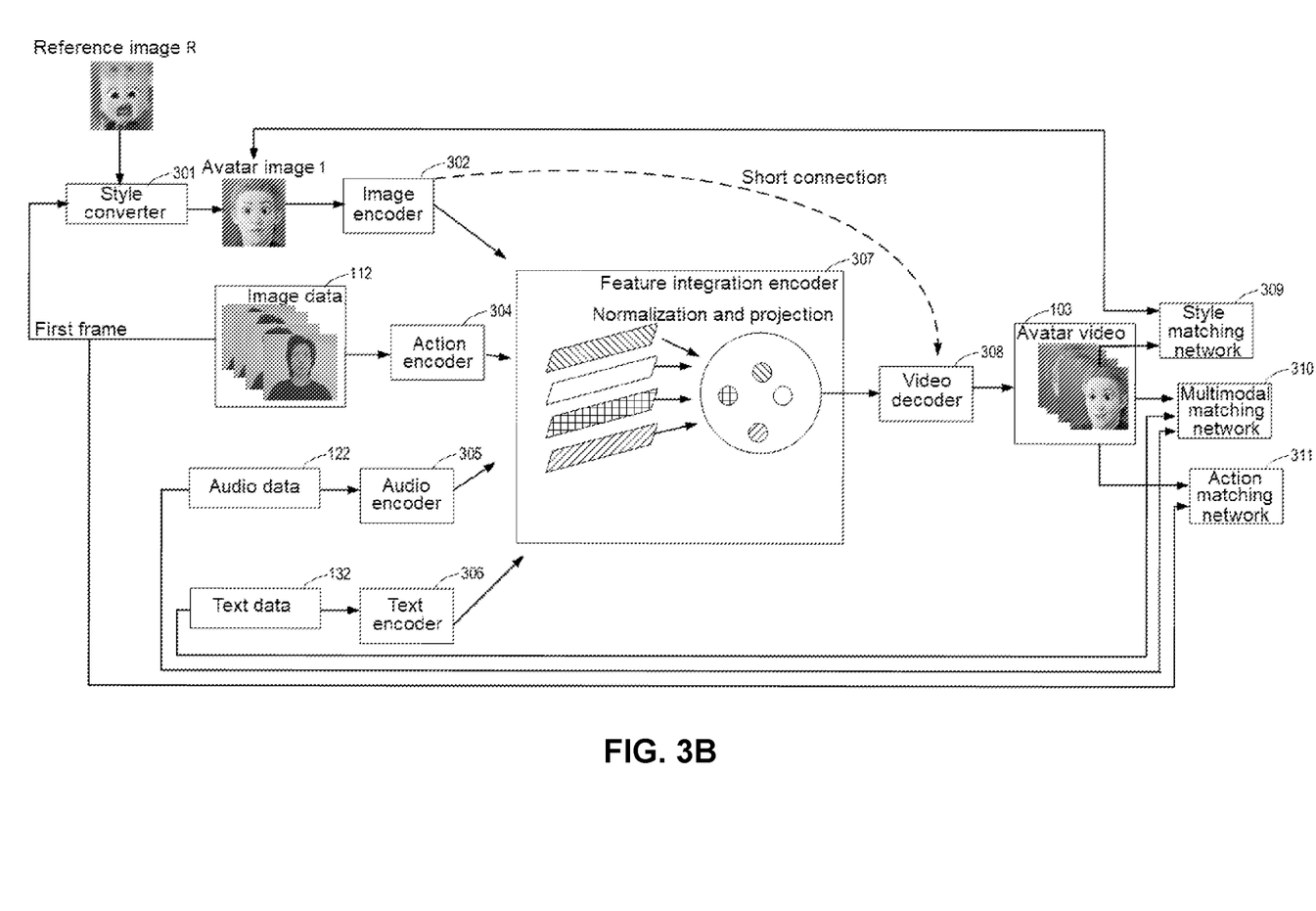

At block 202, a video stream is obtained, the video stream including image data, audio data, and text data corresponding to video frames. As mentioned above, the image data herein (for example, image data 112 shown in FIG. 3A and FIG. 3B) may be obtained in the same way as the images in video stream 102, the audio data herein (for example, audio data 122 shown FIG. 3A and FIG. 3B) may be obtained in the same way as the sounds in video stream 102, and the text data herein (for example, text data 132 shown in FIG. 3A and FIG. 3B) may be obtained in the same way as the subtitles in video stream 102. The video frames herein may include multiple frames (for example, frame 1 to frame n, where n is any positive integer). As shown in FIG. 3A and FIG. 3B, video stream 102 may be received by computing device 101 for further processing. It should be understood that although illustration is made in FIG. 3A with 4 video frames as an example, embodiments of the present disclosure may be implemented with any number of video frames.

At block 204, an avatar image for a first frame is generated by using a reference image and image data for the first frame. For example, as shown in FIG. 3A and FIG. 3B, style converter 301 of computing device 101 takes the image data (for example, image 1) in video stream 102 corresponding to the first frame (for example, frame 1 as shown in FIG. 3A) and reference image R as inputs, and transfers the style of reference image R into the image data (for example, image 1) to obtain an avatar image (for example, avatar image 1 as shown in FIG. 3A and FIG. 3B) customized for the image data (for example, image 1). The avatar image has both the style of reference image R and unique features of a character in video stream 102.

At block 206, a video integration feature is obtained based on the image data, audio data, and text data in the video stream and the avatar image for the first frame. For example, as shown in FIG. 3B, image encoder 302 in computing device 101 may perform deep feature extraction on the avatar image (avatar image 1) obtained at block 204 to obtain an avatar image feature. Action encoder 304 in computing device 101 takes the image data 112 in video stream 102 (for example, image 1 to image 4) as an input, and extracts a temporal feature map from the image data 112 in video stream 102 as an image difference feature. The image difference feature is used for representing a difference between adjacent images (for example, image 1 and image 2, image 2 and image 3, image 3 and image 4, or image 4 and image 5) in the image data, and may be expressed as an action in practice. The image difference feature herein may be extracted using an optical flow model, or may be extracted using a pre-trained CNN network. Audio encoder 305 in computing device 101 may take the audio data 122 in video stream 102 as an input, and perform deep feature extraction on the audio data 122 to obtain an audio feature. The input original audio is first converted to a Mel Frequency Cepstral Coefficient (MFCC) representation so that a one-dimensional audio signal may be expanded into a two-dimensional frequency diagram, and then a VGG-like network is used for extracting the feature map, where VGG denotes Visual Geometry Group, and the VGG-like networks is a type of CNN. Text encoder 306 in computing device 101 may take the text data 132 in video stream 102 as an input, and process the text data 132 to extract a deep text feature.

Next, feature integration encoder 307 in computing device 101 takes the extracted avatar image feature, image difference feature, audio feature, and text feature as inputs, and integrates the avatar image feature, image difference feature, audio feature, and text feature to learn the correlation information between these features to obtain a video integration feature. The video integration feature is mutual information extracted across multiple different pieces of modal data and has more robust representation properties.

At block 208, an avatar video corresponding to the video stream is generated based on the avatar image for the first frame and the above video integration feature. For example, as shown in FIG. 3B, computing device 101 uses short connections to share features from image encoder 302 to video decoder 308. Video decoder 308 takes the avatar image feature and the video integration feature as inputs, and generates avatar video 103 corresponding to video stream 102 based on the avatar image feature and the video integration feature. For example, video decoder 308 may generate an avatar video with facial actions similar to those in the input video stream.

The simple and efficient method above is used for generating a user-defined avatar by transferring the style of a reference image to the face of the user without distorting the unique appearance of the user. Moreover, by combining information from video images, audio, and text to maximize the correlation between different modalities, a user-defined avatar video adapted to a user of a real video and actions thereof can be generated more accurately and with high quality. The user-defined avatar video is customized for the appearance of the user, retains unique features of the user, and can be well distinguished from other avatar videos of similar styles.

In some embodiments, some of the steps of block 206 may be implemented by the following methods to achieve alignment of audio with text and images in a feature domain. First, the avatar image feature is transformed into a first vector in a feature space, the image difference feature is transformed into a second vector in the feature space, the audio feature is transformed into a third vector in the feature space, and the text feature is transformed into a fourth vector in the feature space. Next, a feature integration vector is generated based on the first vector, the second vector, the third vector, and the fourth vector. In order to generate an integration feature that can more accurately represent the video stream, embodiments of the present disclosure may generate a residual vector corresponding to the feature integration vector by using an attention mechanism. The video integration feature at block 206 is then obtained based on the feature integration vector and the residual vector. The above steps may be represented by Equation (1) below:

$$F_{CA} = F_{con} + \sigma\left(\frac{Q_{con}K_{con}^T}{\sqrt{d}}\right)V_{con} \quad (1)$$

$$F_{con} = concat(\phi(T_C(F_S)), \phi(T_C(F_V)), \phi(F_A), \phi(F_T))$$

where $F_S$ is the avatar image feature, $F_V$ is the image difference feature, $F_A$ is the audio feature, $F_T$ is the text feature, $T_C$ is a compression function (e.g., average pooling), $\phi$ is a normalization function, $F_{con}$ is the feature integration vector, $\sigma$ is a sigmoid function, and $Q_{con}$, $K_{con}$, and $V_{con}$ are query, key, and value calculated from $F_{con}$.

Considering that avatar image feature $F_S$ and the image difference feature $F_V$ are two-dimensional feature maps, average pooling is used to compress $F_S$ and $F_V$ into a one-dimensional vector, and then a normalization function (e.g., $l_2$-norm) is used for normalizing all feature maps to transform these features into a unified space to obtain a first vector, a second vector, a third vector, and a fourth vector corresponding to $F_S$, $F_V$, $F_A$, and $F_T$, respectively. Next, the first vector, the second vector, the third vector, and the fourth vector are concatenated (concat) to obtain a vector $F_{con}$.

Any of the above methods may be implemented by an avatar video generation model. In order to further improve the quality of the avatar video obtained by the above method, embodiments of the present disclosure further provide an optimization mechanism to supervise the above generation process of an avatar video and train the avatar video generation model. This self-supervised optimization mechanism may be implemented in at least one of the following example techniques.

Example technique 1 will be described below with reference to multimodal matching network 310 shown in FIG. 3B. First, a loss function (for example, synchronization loss function $\mathcal{L}_{syn}$ in Equation (2) below) is obtained based on generated avatar video 103 and the audio data 122 and text data 132 in video stream 102. The loss function may be obtained based on a video-audio loss function, a video-text loss function, and an audio-text loss function. The video-audio loss function may be obtained based on avatar video 103 and the audio data 122 in video stream 102. The video-text loss function may be obtained based on avatar video 103 and the text data 132 in video stream 102. The audio-text loss function may be obtained based on the audio data 122 and the text data 132 in video stream 102. Next, the loss function obtained in the present embodiment is used to train the avatar video generation model.

For method 200, in a case where the real status of the avatar video is unknown, in order to achieve better matching between the image in generated avatar video 103 and the audio data 122 and text data 132 in video stream 102, the network used in example technique 1 may achieve supervision by learning prior relationships between the avatar image and the audio and text.

Figure 4:
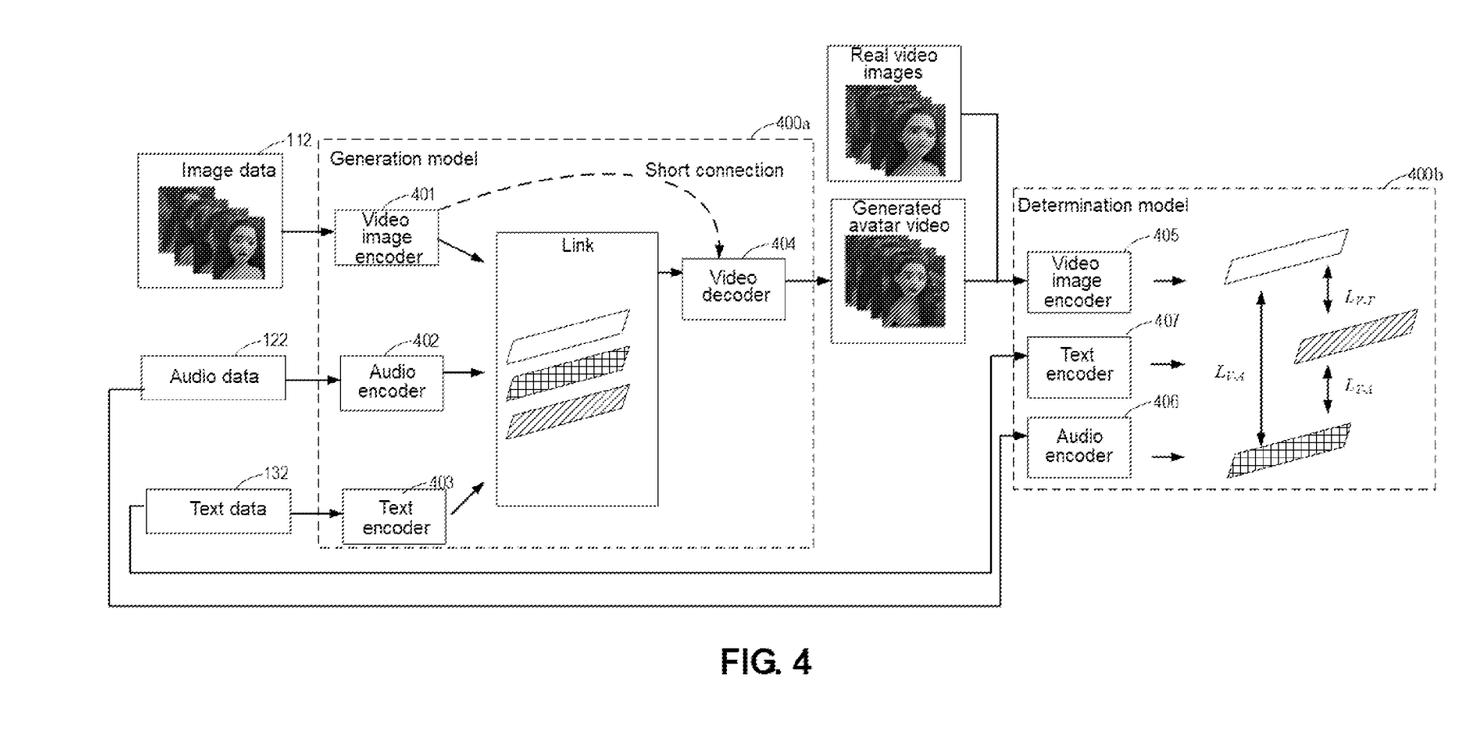
FIG. 4 is a schematic diagram of video processing according to some embodiments of the present disclosure.

For example, for the network adopted in the example technique 1, a multimodal generative adversarial network (GAN) architecture as shown in FIG. 4 is designed. Generation model 400a of this network architecture may include video image encoder 401, audio encoder 402, text encoder 403, and video decoder 404. Video image encoder 401 may be a deep convolutional neural network for gradually reducing a feature dimension and expanding the number of channels. Audio encoder 402, text encoder 403, and video decoder 404 in generation model 400a shown in FIG. 4 are similar to audio encoder 305, text encoder 306, and video decoder 308 shown in FIG. 3B, and the description thereof will not be repeated here. Generation model 400a of the network architecture takes video images, audio, and text as inputs, and utilizes to learn correlations between the inputs. Video decoder 404 is configured for video reconstruction. Determination model 400b of this network architecture adopts another set of video image encoder 405, text encoder 407, and audio encoder 406, and calculates, based on the reconstructed video, the original audio input, the original text input, and real image data (ground truth), to obtain video-audio loss function $L_{V-A}$, video-text loss function $L_{V-T}$, and audio-text loss function $L_{T-A}$. The network adopted in example technique 1 combines the three contrastive loss functions into a synchronization loss function as an output. For example, when an average output value of the synchronization loss function is 1, it indicates that the generated video can achieve good matching with the original audio input and the original text input, and when the average output value of the synchronization loss function is 0, it indicates that the generated video fails to achieve good matching with the original audio input and the original text input. The network shown in FIG. 4 may be trained by collecting a large number of target avatar videos as training data.

Using the trained network as shown in FIG. 4, a process such as method 200 can be supervised, and the avatar video generation model employed by method 200 can be trained, such that the avatar video generated by method 200 has higher quality.

In some embodiments, in order to achieve better style matching between generated avatar video 103 and the avatar image for the first frame, the following example technique 2 (for example, style matching network 309 shown in FIG. 3B) may be adopted. First, a loss function (for example, style loss function $\mathcal{L}_{sty}$ in Equation (2) below) is obtained based on the avatar image for the first frame and avatar images for other frames. The loss function may be obtained by a GAN architecture similar to that in FIG. 4. Parts of the GAN architecture of the present embodiment that are similar to the GAN architecture shown in FIG. 4 will not be repeated, and a difference between the two GAN architectures will be emphasized below. The difference between the GAN architecture of the present embodiment and the GAN architecture shown in FIG. 4 is that the GAN architecture of the present embodiment takes the avatar image for the first frame and the generated avatar video as outputs, and the obtained style loss function will be used for determining whether the generated avatar video has the same style as that of the avatar image for the first frame. Next, the loss function obtained in the present embodiment is used for training the avatar video generation model.

In some embodiments, in order to achieve better matching between actions in generated avatar video 103 and actions in video stream 102, the following example technique 3 (for example, action matching network 311 shown in FIG. 3B, which may be implemented using an optical flow model) may be used. First, the actions in the video stream are obtained based on the image data in the video stream, and then a loss function (for example, optical flow loss function $\mathcal{L}_{of}$ in Equation (2) below) is obtained based on the actions in the video stream and the actions in the generated avatar video. The loss function will be used for supervising action matching between the avatar video and the video stream. Next, the loss function obtained in the present embodiment is used to train the avatar video generation model to achieve an avatar video with higher quality.

In some embodiments, the three example techniques described above may be combined to obtain an avatar video with higher quality. Specifically, the following Equation (2) may be used for expression:

$$L = \alpha \mathcal{L}_{sty} + \beta \mathcal{L}_{syn} + \gamma \mathcal{L}_{of} \qquad (2)$$

$$\mathcal{L}_{sty} = \min_G \max_{D_{sty}} \mathcal{L}(G(\theta, S, V, A, T), D_{sty})$$

$$\mathcal{L}_{syn} = \min_G \max_{D_{syn}} \mathcal{L}(G(\theta, S, V, A, T), D_{syn})$$

$$\mathcal{L}_{of} = \frac{1}{N} \sum_i^N \|OF_{gt}^i - OF_{es}^i\|^2$$

where $\mathcal{L}_{sty}$ is the style loss function $\mathcal{L}_{syn}$ is the synchronization loss function, $\mathcal{L}_{of}$ is the optical flow loss function, G is the avatar video generation function, $D_{sty}$ is style contrast data (for example, used for representing the style of the avatar image for the first frame), $D_{syn}$ is synchronization contrast data (for example, used for representing the audio data and the text data in the video stream), S is the avatar image for the first frame, V is the image data in the video stream, A is the audio data in the video stream, T is the text data in the video stream, $OF_{gt}$ is the action in the generated avatar video, $OF_{es}$ is the action in the video stream, $\mathcal{L}$ is a combined loss function generated based on $\mathcal{L}_{sty}$, $\mathcal{L}_{syn}$, and $\mathcal{L}_{of}$, α, β, and γ are weight parameters, and θ is a parameter used for obtaining $\mathcal{L}_{sty}$ and $\mathcal{L}_{syn}$.

Figure 5A:
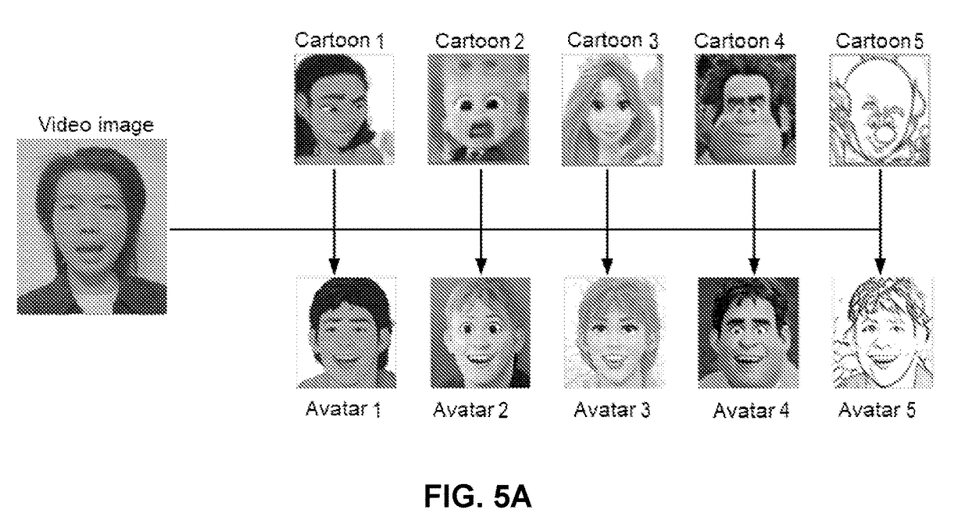
FIG. 5A and FIG. 5B are schematic diagrams of a result obtained by using the methods according to some embodiments of the present disclosure.
Figure 5B:
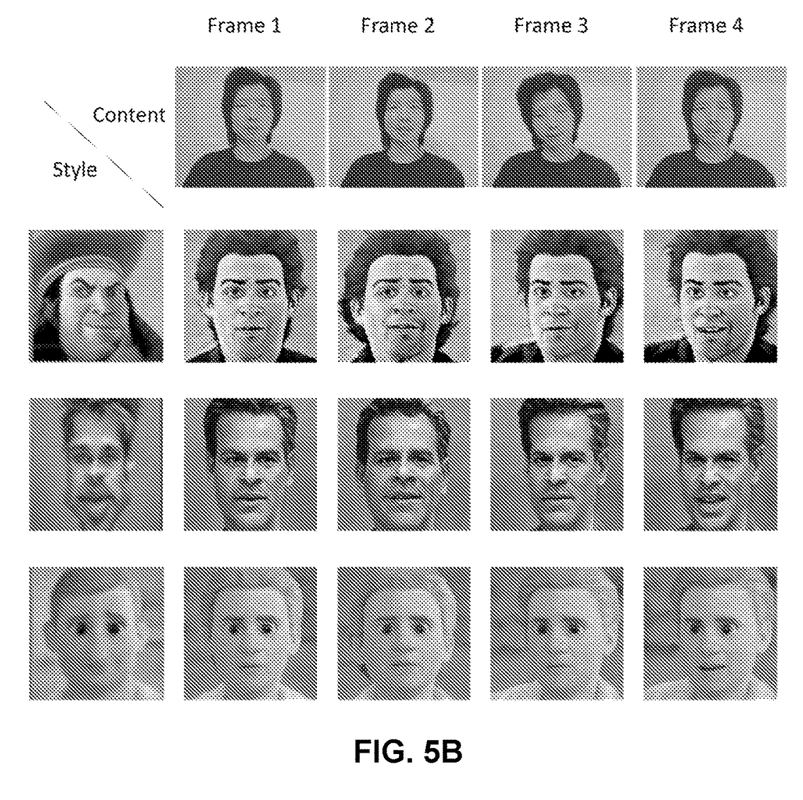

The implementation process of performing avatar processing on a video, provided by embodiments of the present disclosure, has been described above, and the effectiveness of embodiments of the present disclosure will be further demonstrated with reference to examples of FIG. 5A and FIG. 5B. As shown in FIG. 5A, by transferring different styles (Cartoon 1 to Cartoon 5) of different reference images to the same video image, avatars with corresponding styles (avatar 1 to avatar 5) may be obtained, and as can be seen in FIG. 5A, avatars of all styles retain the appearance and expression features of the original video image character. In addition, with further reference to FIG. 5B, it can be seen that by applying three different reference images to image data corresponding to each frame in the video stream, the solution of the present disclosure can also realize consistency between facial expressions of characters in the avatar video and facial expressions of characters in the initial video stream.

Figure 6:
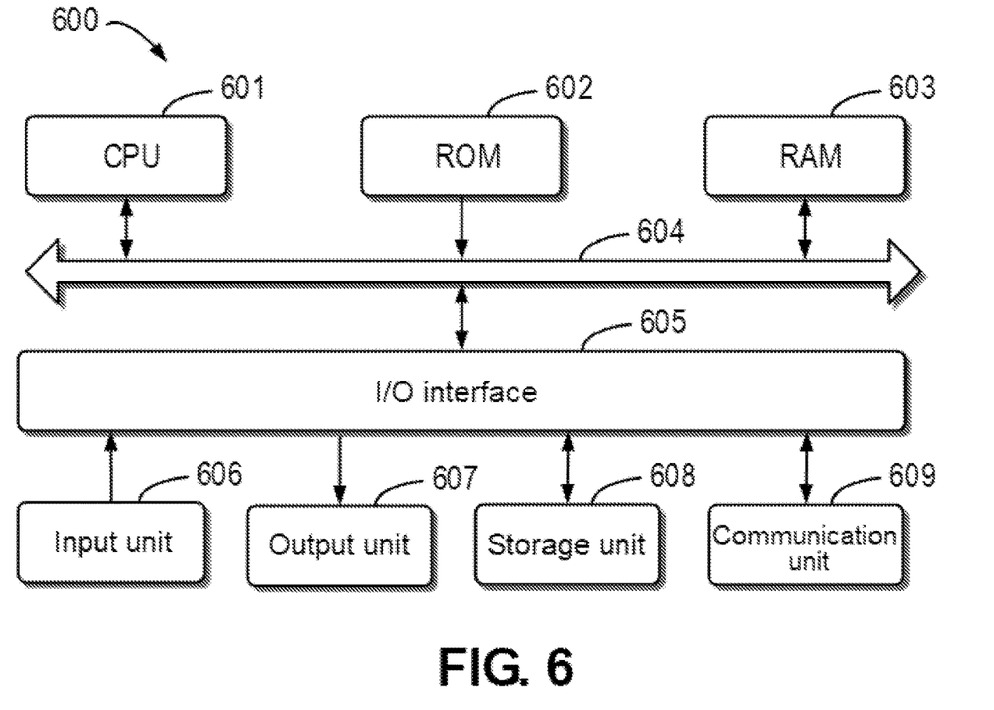
FIG. 6 is a block diagram of an example device that can be used for implementing embodiments of the present disclosure.

FIG. 6 is a schematic block diagram of example device 600 that may be used to implement embodiments of the present disclosure. Device 600 may be used for implementing method 200 of FIG. 2. As shown in FIG. 6, device 600 includes central processing unit (CPU) 601 that may perform various appropriate operations and processing according to computer program instructions stored in read-only memory (ROM) 602 or computer program instructions loaded from storage unit 608 to random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

The various processes and processing described above, such as method 200, may be performed by CPU 601. For example, in some embodiments, method 200 may be implemented as a computer software program that is tangibly included in a machine-readable medium such as storage unit 608. In some embodiments, part of or all the computer program may be loaded and/or installed onto device 600 via ROM 602 and/or communication unit 609. One or more operations of method 200 described above may be performed when the computer program is loaded into RAM 603 and executed by CPU 601.

Embodiments of the present disclosure include a method, a device, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce an apparatus for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or a further device to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented by using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms used herein is intended to best explain the principles and practical applications of the various embodiments and their corresponding improvements, so as to enable persons of ordinary skill in the art to understand the embodiments disclosed herein.

What is claimed is:

1. A method for video processing, comprising:
    acquiring a video stream, the video stream comprising image data, audio data, and text data corresponding to video frames, and the video frames comprising a first frame;
    generating a first avatar image using a reference image and image data for the first frame;
    obtaining a video integration feature based on the first avatar image, the image data, the audio data, and the text data; and
    generating an avatar video corresponding to the video stream based on the first avatar image and the video integration feature;
    wherein obtaining the video integration feature based on the first avatar image, the image data, the audio data, and the text data comprises:
    converting respective features corresponding to the first avatar image, the image data, the audio data, and the text data to respective vectors in a feature space; and
    obtaining the video integration feature based on the respective vectors in the feature space converted from the respective features corresponding to the first avatar image, the image data, the audio data, and the text data.

2. The method according to claim 1, wherein obtaining the video integration feature based on the first avatar image, the image data, the audio data, and the text data comprises:
    obtaining a first avatar image feature, an image difference feature, an audio feature, and a text feature, wherein the first avatar image feature corresponds to the first avatar image, the image difference feature corresponds to image data of adjacent frames in the video frames, the audio feature corresponds to the audio data, and the text feature corresponds to the text data; and
    performing integration processing on the first avatar image feature, the image difference feature, the audio feature, and the text feature to obtain the video integration feature.

3. The method according to claim 2, wherein performing integration processing on the first avatar image feature, the image difference feature, the audio feature, and the text feature to obtain the video integration feature comprises:
    converting the first avatar image feature, the image difference feature, the audio feature, and the text feature into a first vector, a second vector, a third vector, and a fourth vector in the feature space, respectively;
    generating a feature integration vector based on the first vector, the second vector, the third vector, and the fourth vector;
    generating a residual vector corresponding to the feature integration vector by using an attention mechanism; and
    obtaining the video integration feature based on the feature integration vector and the residual vector.

4. The method according to claim 1, wherein the method is implemented by an avatar video generation model.

5. The method according to claim 4, further comprising:
    obtaining a first loss function based on the avatar video, the audio data, and the text data; and training the avatar video generation model by using the first loss function.

6. The method according to claim 5, wherein obtaining a first loss function based on the avatar video, the audio data, and the text data comprises:
   obtaining a video-audio loss function based on the avatar video and the audio data;
   obtaining a video-text loss function based on the avatar video and the text data;
   obtaining an audio-text loss function based on the audio data and the text data; and
   obtaining the first loss function based on the video-audio loss function, the video-text loss function, and the audio-text loss function.

7. The method according to claim 6, wherein the video frames further comprise a second frame, and the method further comprises:
   obtaining a second loss function based on the first avatar image and a second avatar image for the second frame; and
   training the avatar video generation model by using the second loss function.

8. The method according to claim 7, further comprising:
   obtaining a third loss function based on the image data and the avatar video; and
   training the avatar video generation model by using the third loss function.

9. The method according to claim 8, wherein the method further comprises:
   obtaining a fourth loss function based on the first loss function, the second loss function, and the third loss function; and
   training the avatar video generation model by using the fourth loss function.

10. An electronic device, comprising:
    at least one processor; and
    at least one memory storing computer-executable instructions, wherein the computer-executable instructions, when executed by the at least one processor, cause the electronic device to perform operations comprising:
    acquiring a video stream, the video stream comprising image data, audio data, and text data corresponding to video frames, and the video frames comprising a first frame;
    generating a first avatar image using a reference image and image data for the first frame;
    obtaining a video integration feature based on the first avatar image, the image data, the audio data, and the text data; and
    generating an avatar video corresponding to the video stream based on the first avatar image and the video integration feature;
    wherein obtaining the video integration feature based on the first avatar image, the image data, the audio data, and the text data comprises:
    converting respective features corresponding to the first avatar image, the image data, the audio data, and the text data to respective vectors in a feature space; and
    obtaining the video integration feature based on the respective vectors in the feature space converted from the respective features corresponding to the first avatar image, the image data, the audio data, and the text data.

11. The electronic device according to claim 10, wherein obtaining the video integration feature based on the first avatar image, the image data, the audio data, and the text data comprises:
    obtaining a first avatar image feature, an image difference feature, an audio feature, and a text feature, wherein the first avatar image feature corresponds to the first avatar image, the image difference feature corresponds to image data of adjacent frames in the video frames, the audio feature corresponds to the audio data, and the text feature corresponds to the text data; and
    performing integration processing on the first avatar image feature, the image difference feature, the audio feature, and the text feature to obtain the video integration feature.

12. The electronic device according to claim 11, wherein performing integration processing on the first avatar image feature, the image difference feature, the audio feature, and the text feature to obtain the video integration feature comprises:
    converting the first avatar image feature, the image difference feature, the audio feature, and the text feature into a first vector, a second vector, a third vector, and a fourth vector in the feature space, respectively;
    generating a feature integration vector based on the first vector, the second vector, the third vector, and the fourth vector;
    generating a residual vector corresponding to the feature integration vector by using an attention mechanism; and
    obtaining the video integration feature based on the feature integration vector and the residual vector.

13. The electronic device according to claim 10, wherein the operations are implemented by an avatar video generation model.

14. The electronic device according to claim 13, wherein the operations further comprise:
    obtaining a first loss function based on the avatar video, the audio data, and the text data; and
    training the avatar video generation model by using the first loss function.

15. The electronic device according to claim 14, wherein obtaining a first loss function based on the avatar video, the audio data, and the text data comprises:
    obtaining a video-audio loss function based on the avatar video and the audio data;
    obtaining a video-text loss function based on the avatar video and the text data;
    obtaining an audio-text loss function based on the audio data and the text data; and
    obtaining the first loss function based on the video-audio loss function, the video-text loss function, and the audio-text loss function.

16. The electronic device according to claim 15, wherein the video frames further comprise a second frame, and the operations further comprise:
    obtaining a second loss function based on the first avatar image and a second avatar image for the second frame; and
    training the avatar video generation model by using the second loss function.

17. The electronic device according to claim 16, wherein the operations further comprise:
    obtaining a third loss function based on the image data and the avatar video; and
    training the avatar video generation model by using the third loss function.

18. The electronic device according to claim 17, wherein the operations further comprise:

obtaining a fourth loss function based on the first loss function, the second loss function, and the third loss function; and training the avatar video generation model by using the fourth loss function.

19. A computer program product that is tangibly stored on a non-transitory computer-readable medium and comprises computer-executable instructions, wherein the computer-executable instructions, when executed by a device, cause the device to perform operations comprising:

acquiring a video stream, the video stream comprising image data, audio data, and text data corresponding to video frames, and the video frames comprising a first frame;

generating a first avatar image using a reference image and image data for the first frame;

obtaining a video integration feature based on the first avatar image, the image data, the audio data, and the text data; and generating an avatar video corresponding to the video stream based on the first avatar image and the video integration feature;

wherein obtaining the video integration feature based on the first avatar image, the image data, the audio data, and the text data comprises:

converting respective features corresponding to the first avatar image, the image data, the audio data, and the text data to respective vectors in a feature space; and obtaining the video integration feature based on the respective vectors in the feature space converted from the respective features corresponding to the first avatar image, the image data, the audio data, and the text data.

20. The computer program product according to claim 19, wherein obtaining the video integration feature based on the first avatar image, the image data, the audio data, and the text data comprises:

obtaining a first avatar image feature, an image difference feature, an audio feature, and a text feature, wherein the first avatar image feature corresponds to the first avatar image, the image difference feature corresponds to image data of adjacent frames in the video frames, the audio feature corresponds to the audio data, and the text feature corresponds to the text data; and performing integration processing on the first avatar image feature, the image difference feature, the audio feature, and the text feature to obtain the video integration feature.

\* \* \* \* \*